United States Patent [19]
Igarashi et al.
[11] Patent Number: 4,526,601
[45] Date of Patent: Jul. 2, 1985

[54] METHOD OF FIXING AN ELECTRON GUN ASSEMBLY INTO THE NECK OF A CATHODE RAY TUBE AND STRUCTURE SO PRODUCED

[75] Inventors: Kimizo Igarashi, Tokyo; Katsumi Takigawa, Yamato; Tsuneo Muchi, Kawasaki; Yoshio Matsumoto, Tokyo; Kiichi Ueno, Yamanishi; Akio Ohkoshi, Tokyo, all of Japan

[73] Assignee: Sony Corporation, Tokyo, Japan

[21] Appl. No.: 341,642

[22] Filed: Jan. 22, 1982

[30] Foreign Application Priority Data

Jan. 27, 1981 [JP] Japan ................................ 56-10499

[51] Int. Cl.³ ................................ C03B 23/20
[52] U.S. Cl. ................................ 65/59.1; 65/59.21; 65/59.23; 313/477 R
[58] Field of Search ................. 65/59.24, 59.23, 59.21, 65/59.26, 42, 59.1, 54, 59.3; 313/477, 477 R; 174/50.58, 50.5, 50.54, 50.56, 50.57, 50.61

[56] References Cited

U.S. PATENT DOCUMENTS

| | | | |
|---|---|---|---|
| 2,089,044 | 8/1937 | Thomas | 174/50.58 |
| 2,141,387 | 12/1938 | Hale | 65/42 |
| 2,556,059 | 6/1951 | Braunsdorff | 65/42 |
| 2,561,520 | 7/1951 | Lemmens et al. | 65/59.21 |

OTHER PUBLICATIONS

*Glass-To-Metal Seals*, by J. H. Partridge, 1949, published by "The Society of Glass Technology", pp. 2, 37, 60, 61, 62, 109, 110, 116, 204, 205.

*Primary Examiner*—S. Leon Bashore
*Assistant Examiner*—Michael K. Boyer
*Attorney, Agent, or Firm*—Hill, Van Santen, Steadman & Simpson

[57] ABSTRACT

An improved means for incorporating an electron gun and stem assembly into the neck of a cathode ray tube wherein the stem is engaged with a metal collar while providing a groove therebetween, a thermally insulating fusible adhesive having an initial melting point lower than that of the stem is introduced into the groove, an end portion of the neck of the cathode ray tube is inserted into the groove, and the entire assembly is bonded together by means of fusion of the thermally insulating adhesive.

4 Claims, 12 Drawing Figures

METHOD OF FIXING AN ELECTRON GUN ASSEMBLY INTO THE NECK OF A CATHODE RAY TUBE AND STRUCTURE SO PRODUCED

BACKGROUND OF THE INVENTION

1. Field of the Invention

This invention is in the field of incorporating electron gun assemblies into sealed relation within the neck of a cathode ray tube utilizing an insulating, fusible adhesive between a stem structure and a metal collar to provide mechanical rigidity and sealing between the elements.

2. Description of the Prior Art

The prior art technique for sealing an electron gun assembly into the neck of a cathode ray tube can best be described in conjunction with FIGS. 1A and 1B of the drawings. In those Figures, an electron gun 3 is shown attached to stem pins 2 which pass through and are attached to a stem 1. The stem 1 and the electron gun 3 joined to it are inserted into a neck portion 4 of a glass envelope of the cathode ray tube, and then the stem portion 1 and the portion of the neck portion 4 opposite to the same are heated and bonded by means of an oxygen burner 5 to weld or fuse the stem 1 and the neck portion 4 to each other. After fusion, a flared portion 4*a* of the neck portion 4 is cut away as illustrated in FIG. 1B. After the fusion, the gas within the envelope is exhausted through a tip-off tube 6 which extends through the stem portion and then the tip-off tube 6 is sealed to thereby complete the sealing of the cathode ray tube.

In this prior art sealing method, since the stem 1 and the neck portion 4 are heated and fused by means of the oxygen burner 5, the electron gun 3 is necessarily heated to a high temperature and accordingly there is the possibility that the electron gun 3 may become oxidized.

Further, during the sealing process, the removal of the flared portion 4*a* causes glass powder pollution, and increases the assembly time.

Moreover, in the case of a very small sized cathode ray tube such as a view finder or the like, it is practically impossible to provide a tip-off tube 6 through the stem 1 and thus it is not possible to perform the exhausting process after sealing.

SUMMARY OF THE INVENTION

The present invention provides an improved means for locating and bonding an electron gun assembly within the neck of a cathode ray tube. The invention is also concerned with an improved cathode ray tube assembly wherein a fritted glass is used to secure bonding between an electron gun and the neck of the cathode ray tube.

The method of the present invention basically involves engaging a stem with a metal collar while leaving a groove therebetween, introducing a thermally insulating, fusible adhesive having an initial melting point lower than that of the stem into the groove, inserting an end portion of the neck of the cathode ray tube into the groove, and bonding together the neck end portion and the stem by means of the adhesive located in the groove. In the preferred embodiment of the present invention, the adhesive is a low melting glass in frit form and the final bonding procedure causes the frit to become fused and solidified. In another preferred form of the invention, the stem is initially in the form of pressed glass powders, and the binding serves to sinter together the glass powders while the metal collar is being bonded to the stem. The preferred bonding agency is a high frequency heating means which is disposed about the metal collar, the bonding being carried out under vacuum conditions.

An additional feature of the present invention involves surface oxidizing the metal collar before the bonding operation.

In terms of structure, the cathode ray tube of the present invention provides an electron gun assembly which is supported by a stem, with a metal collar which engages the stem while leaving a groove therebetween. A fused thermal insulating adhesive such as a frit composition is located in the groove and bonds the neck portion of the cathode ray tube to the stem and to the metal collar.

In a preferred structural form of the invention, the stem has a larger diameter portion snugly received in the collar and a smaller diameter portion providing the groove between itself and the metal collar.

Other features and improvements of the present invention will become apparent from the following description taken in conjunction with the accompanying drawings.

DESCRIPTION OF THE PREFERRED EMBODIMENTS

Figure 1A:
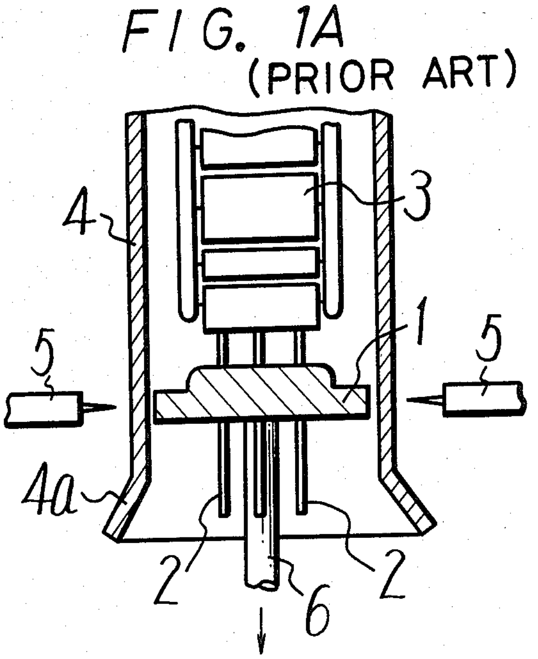
FIG. 1A (PRIOR ART)
FIGS. 1A and 1B are cross-sectional views illustrating the sealing process as conventionally carried out in the prior art.
Figure 1B:
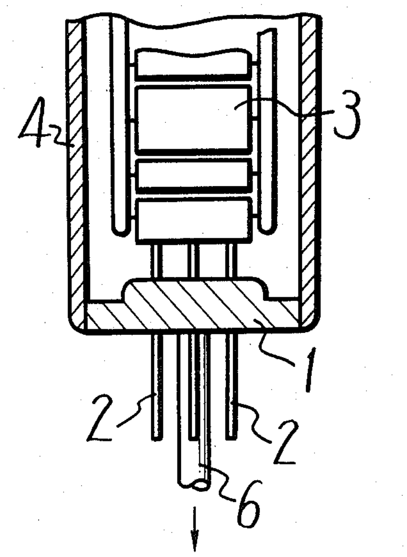
FIG. 1B (PRIOR ART)
Figure 2:
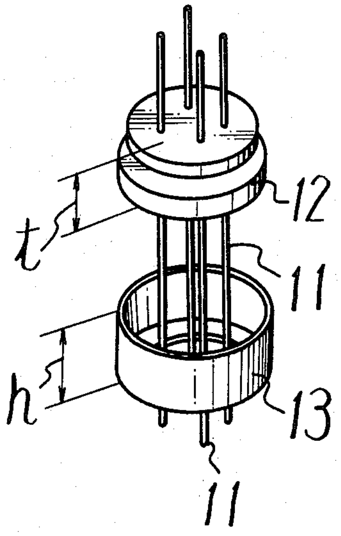
FIGS. 2 through 9 are schematic diagrams illustrating the steps involved in the assembly of the present invention, and modifications thereof.
Figure 3:
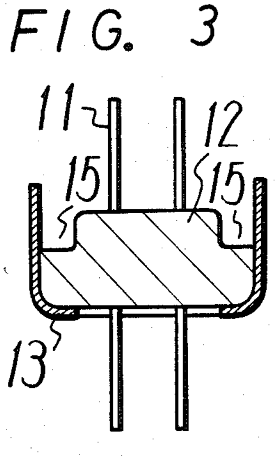

Turning to FIG. 2 of the drawings, the first step is to provide a stem 12 which is formed by press-molding glass powders and which supports the necessary stem pins 11 passing through the stem 12. As illustrated in FIG. 3, the subassembly of FIG. 2 has a larger diameter lower end portion and a smaller diameter upper end portion, the larger diameter lower portion being snugly received within a metal collar 13. The collar 13 is open at both ends and has a radially inwardly extending flange portion at its lower end against which the larger diameter planar surface of the stem 12 is seated. The metal ring may be composed, for example, of an alloy such as "426 alloy" consisting of 42 Ni, 6 Cr and the remainder Fe. In the illustrated example, the height h of the metal collar 13 is a little larger than the thickness t of the stem 12 so that when the stem is seated within the collar 13 as shown in FIG. 3, the upper end of the metal ring 13 is above the planar upper face of the stem 12.

The metal collar 13 may be subjected to preoxidation prior to use, for example, by treatment in wet hydrogen at 1100° C. to form a chromium oxide layer on the surface of the metal collar 13. This oxide layer serves to increase the affinity of the metal toward the glass, and improve the bonding qualities.

The assembly shown in FIG. 3 is then subjected to a heating process at about 900° C. to sinter the stem 12 and to simultaneously bond the metal collar 13 to the stem 12.

The space between the smaller diameter end of the stem 12 and the inner diameter of the metal collar 13 is identified as an annular groove 15 in the drawings. This groove is filled with fritted glass particles 16 having a low initial melting point and having a particle size such that the individual particles substantially fill the radial dimension of the groove 15. The "initial melting point" refers to that temperature at which the glass composition starts to become molten, recognizing that as in any glass composition, the glass will start to soften long before it begins to melt, and that the range from softening to complete fusion may extend over several hundred degrees C.

Figure 10:
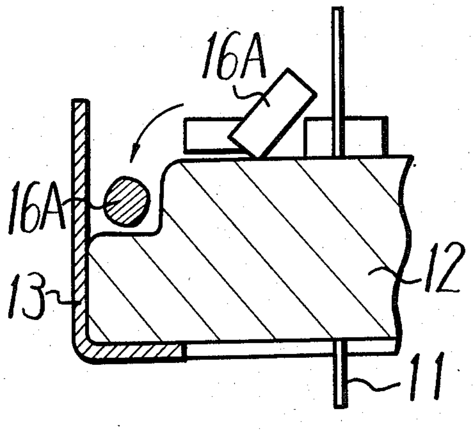
FIGS. 10 and 11 are fragmentary views illustrating a different form of a fritted glass particle which can be used for the purposes of the present invention.
Figure 11:
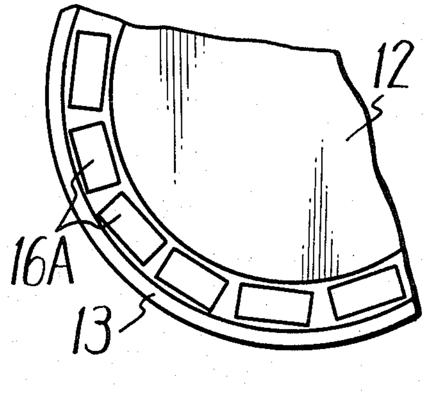

A modified form of the invention is illustrated in FIGS. 10 and 11 in which frit particles 16A in the form of small cylinders are used. Initially, these frit particles 16A are applied onto the stem 12 and then the latter is vibrated, causing the frit particles 16A to be uniformly distributed into the annular groove 15. When this has occurred, as illustrated in FIG. 11, air is blown onto the stem 12 to remove excess frit particles 16A. In this form of the invention, the shape of the frit particles 16A may be that of a sphere, a cylinder, or any geometric shape which settles into the annular groove 15 readily.

Figure 5:
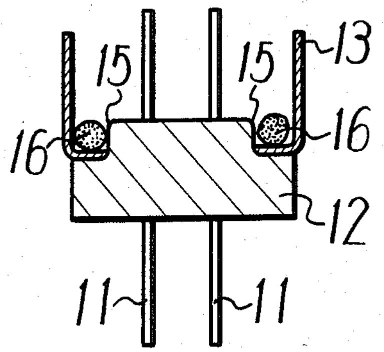

A further modified form of the invention is illustrated in FIG. 5 of the drawings. In this case, the metal collar 13 is seated with its flange portion on the base of the groove 15. In this embodiment, the neck portion 4 of the cathode ray tube can be aligned more precisely by the inner surface of the flange of the metal collar 13. In this case, a low initial melting fritted glass 16 is deposited in the annular groove 15 as in the previously described embodiment.

Figure 4:
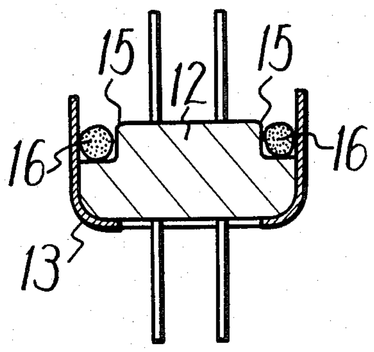
Figure 6:
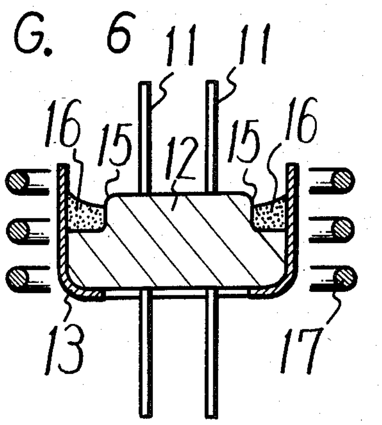

The stem 12 and the metal collar 13 assembled as shown in FIGS. 4 and 5 are subjected to heating at about 400° C. in vacuum through the use of a high frequency heating apparatus 17 as shown in FIG. 6. This heating operation by the high frequency heating apparatus 17 serves to fuse the fritted glass and any gas contained within the glass particles is removed. Since the heating process is carried out in vacuum, the stem pins 11 are not subjected to oxidation.

In addition to the high frequency heating apparatus 17 shown, a heating furnace using a Nichrome wire may also be employed.

In the case of high frequency heating, if the metal collar 13 is coupled to the stem 12 as shown in FIG. 5, the frit particles 16 contact the metal collar 13 over a wide area and effective heating can be carried out.

Figure 7:
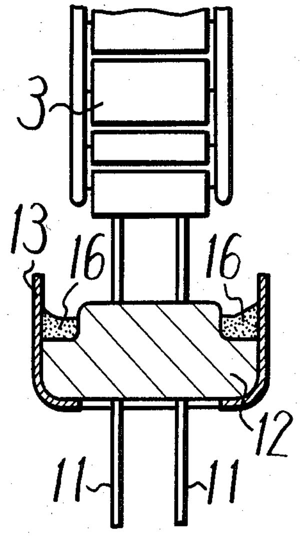
Figure 8:
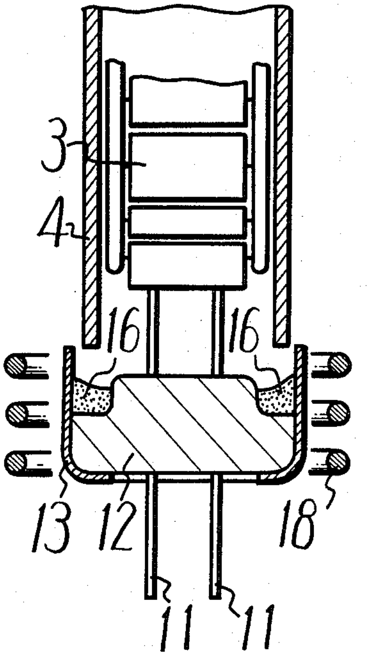
Figure 9:
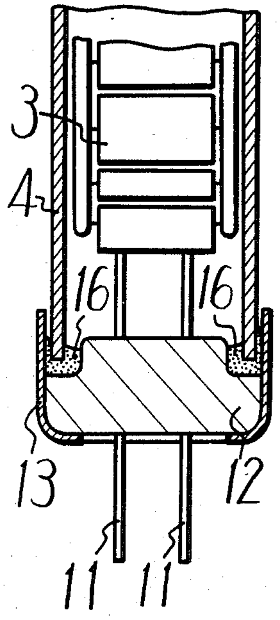

The assembly of the electron gun starts with the showing in FIG. 7. The electron gun 3 is attached to the stem pins 11. Thereafter, as shown in FIG. 8, the electron gun is inserted into the neck portion 4 of the cathode ray tube. In addition to the neck portion, the cathode ray tube has the usual face formed with a phosphor screen, and a conical portion joining the face with the elongated neck portion 4. The lower end of the neck portion 4 is abutted against the glass deposit 16 and the metal collar 13 is heated in vacuum up to about 400° C. by a high frequency heating apparatus 18 to melt the glass by the radiant heat from the metal collar 13 to thereby seal the neck portion 4 to the stem 12 as shown in FIG. 9. The lower end face of the stem 12 shown in FIG. 5 remains flat, although the lower end face of the stem 12 shown in FIG. 6 occasionally bends due to the radiant heat used to fuse the frit. When the structure shown in FIG. 5 is employed, the lower end face of the stem 12 can be used as a reference surface for assembling the electron gun 3 and the lower end of the neck portion 4 to the stem 12.

In addition to using the fritted glass 16 in the form of particles 16A, a segmented ring composed of glass frit and conforming to the shape of the groove 15 may be employed. When such split rings are used, in contrast to the case where fritted glass powders are used, there is no pollution problem with the powder and the handling therefore becomes simpler.

As described, in the present invention the metal collar 13 is first fixed to the stem 12, and the fritted glass 16 of low initial melting temperature is charged into the annular groove 15 between the stem 12 and the metal collar 13. Then the metal collar 13 is vacuum heated, for example, by high frequency heating apparatus 17 to melt the glass 16 by radiant heat from the metal collar 13 thereby removing any gas contained in the glass particles. The stem 12 is then assembled with the electron gun 3 and the assembly is bonded to the neck portion 4 of the cathode ray tube by means of the high frequency heating apparatus 18 to melt the glass deposit 16 and thereby seal the neck portion 4 to the stem 12 and to the collar 13. When carried out in this way, the sealing can be accomplished at relatively low temperatures and therefore the electron gun 3 assembled therein is protected against oxidation during the sealing process.

With the present invention, it is not necessary to provide the tip-off tube through the stem 12 since the gas within the tube is evacuated during the vacuum bonding treatment, so the present invention is suitable for sealing very small size cathode ray tubes such as a view finder or the like.

Since the heating treatment of the final bonding operation is carried out by means of high frequency heating apparatus, localized heating becomes possible and it is not necessary to heat portions of the tube unnecessarily, which might introduce gas inside the tube.

The above description refers to preferred embodiments of the invention, but it will be apparent that many modifications can be made by those skilled in the art without departing from the spirit or scope of the novel concept of the invention.

We claim as our invention:

1. A method of fixing an electron gun and stem assembly into the neck of a cathode ray tube which includes the steps of:

assembling said stem with a metal collar having a radially inwardly extending flange portion at the base thereof, said stem having a reduced diameter upper portion which provides a groove between itself and the inner periphery of said collar, said metal collar being seated with its inwardly extending radial flange on the base of said groove;

introducing a glass frit having an initial melting point lower than that of said stem into said groove, heating the resulting assembly in vacuum by means of high frequency heating to cause said metal collar to give off radiant heat which removes any gas contained within said glass frit, inserting the end of a cathode ray tube neck into the glass within said groove, heating said assembly while so positioned to render the glass in said groove molten, and solidifying the glass in said groove to cause said neck to be bonded therein.

2. A method according to claim 1 in which: said stem is initially in the form of pressed glass powders.

3. A method according to claim 2 in which: said metal collar is bonded to said stem while said pressed glass powders are sintered.

4. A method according to claim 2 in which: said metal collar is bonded to said stem after said pressed glass powders are sintered by means of said glass frit.

* * * * *